Figure 1:
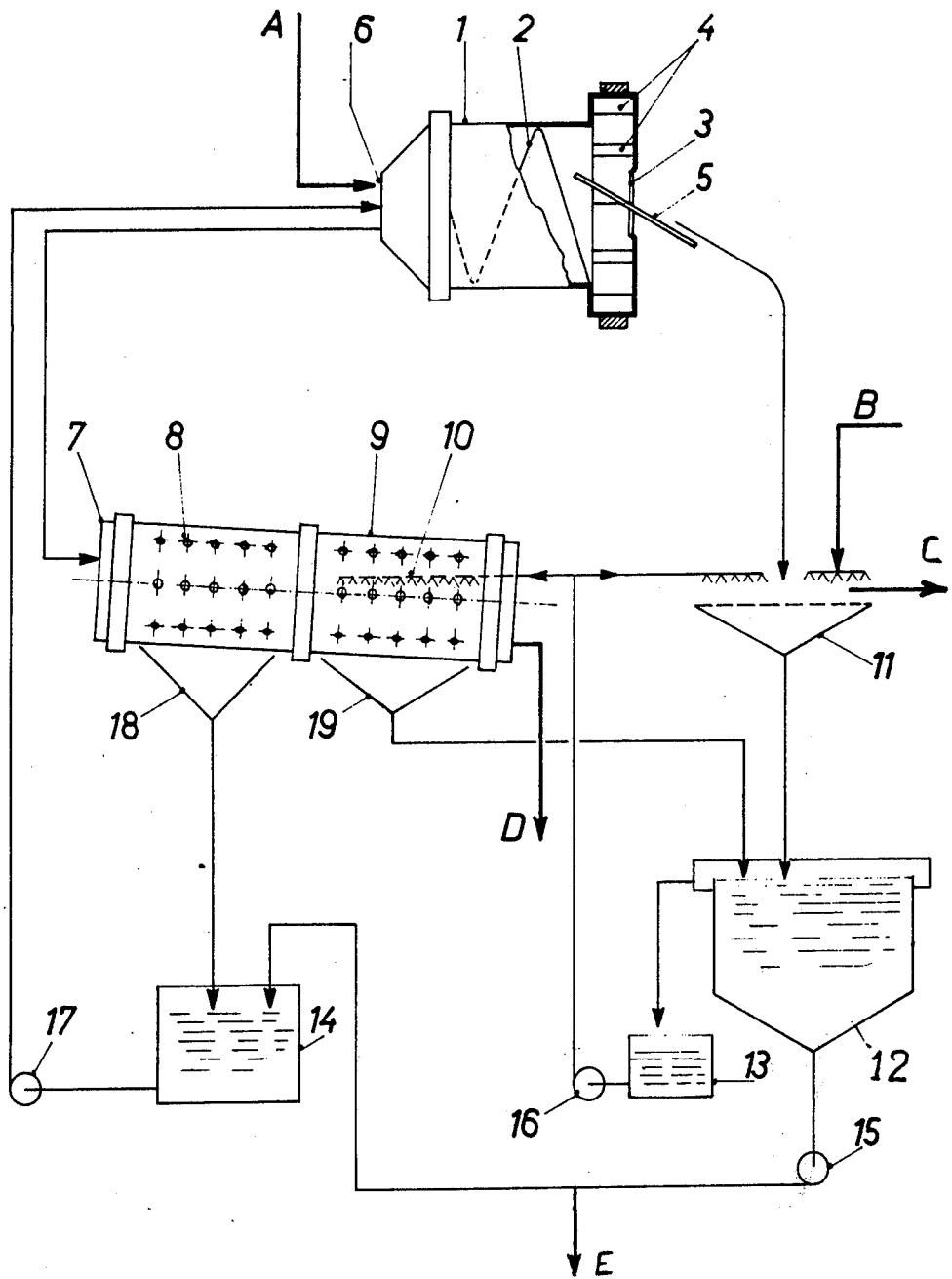

United States Patent
Tremolada

[11] 4,026,477
[45] May 31, 1977

[54] PROCESS FOR THE SEPARATION OF COMPONENTS OF SCRAP STORAGE BATTERIES

[75] Inventor: Gustavo Tremolada, Milan, Italy

[73] Assignee: A. Tonolli & Co. S.p.A., Milan, Italy

[22] Filed: June 9, 1972

[21] Appl. No.: 261,398

Related U.S. Application Data

[63] Continuation-in-part of Ser. No. 56,070, June 26, 1970, abandoned, which is a continuation of Ser. No. 516,396, Dec. 27, 1965, abandoned.

[30] Foreign Application Priority Data

Jan. 15, 1965 Italy .................................. 796/65

[52] U.S. Cl. .................................. 241/17; 241/24; 209/11; 209/172.5
[51] Int. Cl.² .................................. B02C 21/00
[58] Field of Search .................. 209/2, 10–12, 209/172, 172.5, 173; 241/14, 20, 24, 2, 17, 18, 23

[56] References Cited

UNITED STATES PATENTS

| | | | |
|---|---|---|---|
| 961,121 | 6/1910 | Goltra | 209/11 |
| 1,895,504 | 1/1933 | Wuensch | 209/172.5 |
| 2,356,648 | 8/1944 | Brusset | 209/172.5 |
| 2,690,261 | 9/1954 | Maust | 209/172.5 |
| 2,693,878 | 11/1954 | Driessen et al. | 209/172.5 |
| 2,942,792 | 6/1960 | Anderson et al. | 241/14 |
| 2,966,350 | 12/1960 | Neumann | 75/77 X |
| 3,004,721 | 10/1961 | Notzold | 241/14 X |
| 3,078,048 | 2/1963 | Russell et al. | 241/17 |
| 3,080,055 | 3/1963 | Riesbeck | 209/11 X |
| 3,235,072 | 2/1966 | Nelson | 209/172.5 X |
| 3,289,950 | 12/1966 | Helming et al. | 241/18 |
| 3,393,876 | 7/1968 | Elmore | 209/3 X |

Primary Examiner—Frank W. Lutter
Assistant Examiner—Ralph J. Hill
Attorney, Agent, or Firm—Stevens, Davis, Miller & Mosher

[57] ABSTRACT

A process for separation of the components of scrap lead storage batteries including crushing, and then heating the pieces while tumbling, dry screening the paste from the residual materials which are fed to a sink-float apparatus whose fluidized pulp comprises a liquid suspension of battery paste. The pH and density of the pulp are regulated in the pH range of 7–10 by addition of sulphuric acid. After sink-float separation the drained and washed materials are recovered and the pulp and wash liquid are recycled back into the system.

5 Claims, 1 Drawing Figure

PROCESS FOR THE SEPARATION OF COMPONENTS OF SCRAP STORAGE BATTERIES

This application is a continuation-in-part of U.S. application Ser. No. 56,070, filed June 26, 1970, now abandoned, which was a continuation of U.S. application Ser. No. 516,376, filed Dec. 27, 1965 also now abandoned.

This invention relates to a selective separation process of the various materials constituting storage batteries, particularly lead batteries.

More particularly, the present invention relates to a process for treating scrap storage batteries or their parts through which it is possible to separate: the metallic components, i.e. grids and conductors; the inactive materials, i.e. those which constitute the inactive parts of batteries, such as containers, separators, sealing compositions; and the active substance, or paste, formed by lead oxides and sulphates.

Particularly favorable results are obtained when for the battery crushing is employed the drum crusher disclosed in the U.S.A. Pat. No. 3,614,003, which allows a convenient size reduction and a thorough separation of the dry paste.

Although the following description refers to the treatment of lead storage batteries it should be understood the general mode of operation applies also to other types of batteries involving only such modifications as are readily apparent to those of ordinary skill in the art.

It is known that the main components of lead storage batteries, excluding the electrolyte with which the present invention is not concerned, are 1. antimony-lead alloy containing, in some cases, other minor constituents, used for the construction of grids and electrical connections;
2. lead oxides and sulphates, i.e. paste;
3. ebonite and/or other synthetic resins, glass fibers and sealing compositions, materials which are employed for constructing containers, separators and for sealing the upper part of batteries to the container.

The components in categories 1, 2 and 3, will hereinafter be referred to, respectively as metallic components, paste, and inactive material.

The known processes for recovering the active substance and the metallic components of batteries (inactive materials are not generally recovered) are realized:

a. through a direct metallurgical treatment of the batteries;
b. separating on one hand the paste together with the metallic compounds, and on the other the inactive materials, thereafter metallurgically treating the mixture of active substance and metallic compounds.

Group (a) processes present, among other things, the disadvantage that the incombustible substances, e.g. the alkaline-earth metal compounds contained as filler in the containers, slow down the melting furnace operation and that the considerable sulphur content of the container, when in ebonite, gives birth to a sensible amount of lead by products.

Group (b) processes, although easier to operate, present the disadvantage of requiring a large use of man power for the manual operation of separating the inactive materials from the remaining ones.

Moreover both group (a) and group (b) processes present the serious inconvenience that they generate during the melting operation, a lead-antimony alloy having from 2 to 4% by weight of antimony. Said alloy may not be used for grid manufacturing which requires 4-8% antimony alloys, nor for lead oxide manufacturing which requires pure lead.

This state of affairs depends on the fact that, as previously mentioned, the recovery of lead from scrap batteries was carried out, up to now, by feeding the melting furnaces with batteries comprising their containers, or at best with a mixture of metallic components and paste.

We have now found a process which allows one to selectively separate the metallic components from the paste and from the inactive materials so that it is possible to obtain, in the subsequent metallurgical treatment of the paste, lead containing about 1% of antimony or less and a lead-antimony alloy with an antimony content practically equal to that of the metallic parts of batteries.

The process according to this invention bases itself on the finding that it is possible to separate the various components of the batteries previously crushed, resorting for this purpose to the sharp density difference of said components.

More precisely the process according to this invention, employs for said separation a liquid or a pulp having respectively a density intermediate between that of the metallic components and that of the inactive materials.

Further we have found:

a. that the only convenient way to perform the gravimetric separation is to use a pulp, made by an aqueous suspension of the paste, expecially because it does not contaminate the components of the batteries, which contamination would certainly occur if for instance a ferro-silicon based pulp would be used.

b. that to avoid difficulties in regulating the gravimetric separation, practically all the paste must be removed from the crushed batteries.

c. that to remove practically all the paste substantially in the pure state, batteries must be dryed, preferably during their crushing, and crushing must be done so as to break batteries in pieces of sizes between 2 and 15 cm, in medium 8 cm, and the crushed material must be dry screened with screen openings in the range of 2 to 30 mm. It has been remarked in fact that also by emptying from the batteries their acid content, before crushing them, it is impossible to separate by screening the paste which, by tenaciously retaining the humidity, behaves like a mud and easily obstructs the screen openings. Of course by drying the batteries a notable heat saving is obtainable in comparison with the smelting of the wet paste; further waste heat sources may be conveniently utilized.

d. in order to obtain a practically complete detachment of the paste from the grids and from the containers, and to avoid the obstruction of the screen or the fine pulverization of the active substance — which would produce a great cloud of (poisonous) dust complicating its recovery — paste must be dried so as to contain from 2 up to 7% of humidity and preferably about 5%. To do so, the batteries are heated at 35°-50° C, preferably by direct heat exchange with hot counter current gas preferably, as said above, during their crushing.

e. that, surprisingly, by heating the batteries during the crushing to the above mentioned temperatures, a full neutralization of free acidity, always present, is reached owing to the reaction of the sulphuric acid with the lead oxides of the paste itself. It is evident that said neutralization allows the crushing apparatus to be made of common steel.

f. that the density of the pulp can be from 10 to 100 percent greater than that of the substance composing the battery containers. A pulp with a density higher than the maximum will settle too rapidly and prevent the maintaining of an homogeneous suspension, while a density lower than the minimum will not allow a good separation.

g. that the pulp tends, with use, to increase its viscosity up to such values which make impossible the gravimetric separation, and that it is sufficient to regulate the pH of the pulp between 7 and 10 by suitable addition of sulphuric acid to avoid any such inconvenience. It is pointed out that the sulphuric acid cannot be substituted with other acids, which should be considered as contaminants capable e.g. of producing during the metallurgical treatment of the metallic values, acid fumes highly corrosive for the furnace and related equipment.

h. that, as already mentioned, the drum crusher disclosed in U.S. Pat. No. 3,614,003 is not only particularly suitable to break batteries in sizes between 2 and 15 cm but also that the time necessary for breaking batteries therewith — i.e. 5–20 minutes — matches well with the time necessary to dry the batteries by passing hot gases through the drum crusher.

The process in its general lines is thus realized:

a. batteries are crushed in sizes between 2 and 15 cm and dried so to obtain a paste with a humidity content between 2 and 7%;

b. the crushed material is screened to remove the fines, i.e. practically all the active substance, while the remainder is fed to a separating zone;

c. in the separating zone, which contains the pulp of the mentioned density, the inactive material, consisting essentially of the fragments of containers separators and sealing composition, is removed as float and the metallic components consisting substantially of lead-antimony alloy, are removed as sink;

d. the float and the sink are drained, washed and separately collected;

e. the drainings and washings are recycled to the separating zone while maintaining the density of the pulp within said values by regulating the fresh water added to the cycle and withdrawing any excess of the paste;

f. the pH of the aqueous suspensions being maintained within the value of 7 and 10 by continuous or discontinuous addition of sulphuric acid.

Preferably the screening of crushed batteries is so regulated that the amount of paste entering the separating zone equals the amount removed with the sink and the float. By so operating, while a certain necessary replacement of the paste in the pulp is maintained, the regulation of the process becomes very simple indeed.

The process is further described according to a preferred embodiment with reference to the accompanying FIG. 1.

EXAMPLE

The plant for the gravimetric separation comprises: a conventional wet separator 1 having a revolving drum provided with a spiral 2, a discharge mouth 3 furnished with paddles 4, a chute 5 and a charging mouth 6; a revolving drum 7 the axis of which is inclined slightly to the horizontal with a plurality of openings in the walls and divided in two sections 8 and 9, drum 7 is also provided with bored pipes 10 for washing water; two hoppers 18 and 19 for collecting and conveying the drain liquids from sections 8 and 9 of drum 7; a screen 11; a thickener 12; a tank 13 for collecting the decanted water from thickener 12; a tank 14 for collecting the pulp, provided with a non represented stirrer; and pump 15, 16, 17. The process with reference to FIG. 1 may be so described: Lead storage batteries are loaded in bulk in a drum crusher, not represented, of the type disclosed in U.S. Pat. No. 3,614,003 together with a stream of counter-current hot gas. The crushed batteries, in sizes between 2 and 15 cm, are freed of paste by means of the screening section of the drum crusher — provided with openings between 2 and 30 mm —, are fed together with the pulp into the mouth 6 of separator 1. The pulp comes out from mouth 6 of separator 1 together with the floating inactive materials, while the metallic components are conveyed through spiral 2 towards mouth 3 and thereto discharged by paddles 4 and chute 5. The inactive materials and the pulp discharged from 1 are conveyed in drum 7, the pulp is recovered in the tank 14 and the inactive materials after being washed with water, by means of pipes 10 and pump 16, are discharged at D. The metallic components are sent onto screen 11 and after being washed with water recycled from 13 and with fresh water B, are discharged at C. Washing waters from section 9 of drum 7 and from screen 11 are sent into the continuous thickener 12, the overflow of which is sent into tank 13, the thickened pulp is recycled, through pump 15, into the tank 14; any possible excess of paste is removed from the cycle at E, e.g. by filtering part of the thickened pulp discharged from thickener 12. It is evident that by adopting a sufficiently powerful thickener 12, it is possible, by controlling the flow of pump 16 to regulate within wide limits the amount of washing water and thus to reduce at will the amount of active substance adhering to the sink and to the float products. The following operating data are taken from an industrial plant which treats 500 Tons/day of lead storage batteries complete with their cases and freed from electrolyte. Average composition of the batteries

|  | % by weight |
|---|---|
| inactive material | 20 |
| metallic components | 30 |
| paste | 50 |

The battery cases are of ebonite having a density of 1.40 – 1.45 kg/dm$^3$.

| Crushing and drying | % by weight | % by weight |
|---|---|---|
| Initial free acidity (as H$_2$SO$_4$) in the paste |  | 0.5 –1 |
| Initial moisture in the paste | % | 15 |
| Heating temperature | ° C | 45 |
| Final moisture, in the paste | % | 5 –6 |
| Final free acidity in the paste |  | zero |
| Average size of the screened paste | mm | 0.7 |
| Average size of the other material | cm | 8 |
| Gravimetric separation |  |  |
| Pulp density | kg/dm$^3$ | 1.85 –2 |
| pH | from 7 up to 10 |  |
| Yields and consumption |  |  |
| yield on the paste | % | 99.80 |
| yield on the metallic components | % | 99.90 |
| foregoing substances in the paste | % | 3 |
| foregoing substances in the metal- |  |  |

| | | |
|---|---|---|
| lic components | % | 2 |
| water consumption per Ton of batteries | dm³ | 30–40 |
| Kg H₂SO₄ 50° Be per Ton of batteries | | 0.1–0.2 |

I claim:

1. A process for the separation of scrap lead storage batteries and parts thereof in three parts, namely metallic components, paste and inactive material, essentially comprising:

emptying from the batteries their sulphuric acid content; then crushing the batteries into pieces of sizes between 2 and 15 cm, apart from the paste which is detached;

heating the pieces and paste at 35°–50° C, while tumbling them, until the paste reaches a humidity content of 2–7%, thereby neutralizing the residual acidity of the paste;

then separating and recovering the dry paste from the materials from the preceding step by dry screening said materials using a screen having openings of size in the range of 2 to 30 mm;

then feeding the residual material, substantially free of paste, into a separating zone containing an aqueous suspension of the paste, and having a density from 10 to 100% greater than that of the battery containers, and a pH regulated between 7 and 10, the pH and viscosity of the suspension being regulated by addition of sulphuric acid;

removing as sink the metallic components and as float the inactive material;

draining and washing the sink and float respectively, and recirculating the suspension of paste at the proper density to the separating zone.

2. A process according to claim 1, wherein crushing and heating are carried out contemporaneously.

3. A process according to claim 1, wherein water from the washing steps is recirculated through a thickener for recovering paste therefrom, the overflow from said thickener being recirculated as reuseable wash water.

4. A process according to claim 1, wherein the heating is performed by direct heating with hot gases in counter-current flow with respect to the material.

5. A process according to claim 1, wherein the density of the fluidized pulp, when the cases are in ebonite, is between 1.7 and 2 kg/dm³.

* * * * *